(12) United States Patent
Son et al.

(10) Patent No.: US 7,809,524 B2
(45) Date of Patent: Oct. 5, 2010

(54) APPARATUS AND METHOD FOR PREDICTING WAVE PROPAGATION CHARACTERISTIC OF MULTIPLE ANTENNA SYSTEM

(75) Inventors: Ho-Kyung Son, Daejon (KR); Heon-Jin Hong, Daejon (KR); Chang-Joo Kim, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 244 days.

(21) Appl. No.: 12/182,523

(22) Filed: Jul. 30, 2008

(65) Prior Publication Data

US 2009/0102730 A1   Apr. 23, 2009

(30) Foreign Application Priority Data

Oct. 18, 2007  (KR) .................... 10-2007-0105046

(51) Int. Cl.
*G06F 19/00* (2006.01)
(52) U.S. Cl. ...................................... 702/179
(58) Field of Classification Search ................ 702/179, 702/76, 77, 182–185
See application file for complete search history.

(56) References Cited

U.S. PATENT DOCUMENTS 6,341,223 B1   1/2002   Park et al.

2003/0167156 A1*  9/2003  Alba ............................ 703/2
2004/0259554 A1* 12/2004  Rappaport et al. .......... 455/446

FOREIGN PATENT DOCUMENTS

KR   1999-0080905   11/1999

OTHER PUBLICATIONS

Tameh, K.H., et al., "Modelling and performance prediction for multiple antenna systems using enhanced ray tracing", Wireless Communications and Networking Conference, IEEE Communications Society, pp. 933-937, 2005.
Molisch, Andreas F., "A generic model for MIMO wireless propagation channels in macro and microcells", IEEE Transactions on Signal Processing, vol. 52, No. 1, pp. 61-71, Jan. 2004.

* cited by examiner

*Primary Examiner*—Edward Raymond
(74) *Attorney, Agent, or Firm*—Rabin & Berdo, P.C.

(57) ABSTRACT

There is an apparatus for predicting wave propagation characteristic of a multiple antenna system, including: a transmission position calculator for calculating transmission positions of multiple transmitting antennas; a wave propagation path searcher for searching for a wave propagation path for each of a plurality of image antennas generated for each of said multiple transmitting antennas; a reflection electric field calculator for calculating a partial reflection electric field on the searched propagation path; and a received power calculator for calculating a received power based on the calculated partial reflection electric field.

10 Claims, 5 Drawing Sheets

APPARATUS AND METHOD FOR PREDICTING WAVE PROPAGATION CHARACTERISTIC OF MULTIPLE ANTENNA SYSTEM

BACKGROUND OF THE INVENTION

1. Field of the Invention

The present invention relates to an apparatus and method for predicting wave propagation characteristic of a multiple antenna system; and, more particularly, to an apparatus and method for predicting wave propagation characteristic of a system, in which electric wave is sent by multiple antennas and received by a single antenna in an urban canyon model and so on, by searching for all propagation paths of multiple reflected waves from respective image antennas.

This work was supported by the IT R&D program of MIC/IITA [2005-S-046-03, "Development of the basic spectrum resource utilizing technology"].

2. Description of Related Art

A variety of mobile communication systems, such as Personal Communication System (PCS), WiBro, Wireless Local Area Network (WLAN) and so on, have been established and are being currently serviced. The use of such wireless communication equipments has mainly been concentrated in urban areas. Therefore, it is a tendency that frequency is increased and a multiple antenna system (Multiple Input Multiple Output: MIMO) is introduced for increase in capacity.

It is expected that multiple antennas will be introduced for capacity expansion in most base stations in the future and terminals will have a single antenna owing to problems with implementation. Hence, a precise prediction of received power in such multiple antenna system is necessary to properly determine a position of a base station antenna and a service area of microcell.

In addition, in order to find out wave propagation characteristic of microcell, an appropriate urban modeling is required. To this end, a canyon model consisting of three loss dielectrics was generally introduced to predict a received power. In such a canyon model, a transmitting antenna and a receiving antenna are arranged orthogonally to the ground, and thus, numerous reflected waves exist therein. At this time, if a propagation path, through which an electric wave originating from the transmitting antenna arrives at the receiving antenna, is known, it is possible to obtain a reflection coefficient at each reflection point and also to know how many times reflection occurs among propagation paths of reflected waves. For this purpose, an image technique has been introduced.

FIG. 1 is an explanatory diagram showing one example of coordinate of a general urban canyon model, FIG. 2A is a view showing one example of a general generation process of image antennas, and FIG. 2B is an explanatory diagram showing one example of giving number to image antennas according to the prior art.

As illustrates in FIG. 1, the prior art method models a straight road in urban areas in dielectric canyon composed of a left building #1 1, a right building #2 2, and a road (the ground) 3.

Here, $\epsilon_1$ denotes permittivity for determining the material of the left building #1 1, $\epsilon_2$ represents permittivity for determining the material of the right building #2 2, and $\epsilon_3$ indicates permittivity for determining the material of the ground 3.

In addition, $\mu_1$ denotes permeability for determining the material of the left building #1 1, $\mu_2$ indicates permeability for determining the material of the right building #2 2, $\mu_3$ represents permeability for determining the material of the ground 3.

Further, a transmitting antenna 4 and a receiving antenna 5 exist within the urban canyon.

Here, the transmitting antenna 4 consists of four multiple antennas and its coordinate represents a representative value, that is, $(x_t, y_t, z_t)$. And, the receiving antenna 5 has a coordinate of $(x_r, y_r, z_r)$.

Meanwhile, an electric wave originating from the transmitting antenna 4 propagates in every direction. The wave includes a direct wave arriving directly at the receiving antenna 5, and multiple reflected waves that suffer from one or more reflections from three surfaces, that is, two building wall surfaces (left building #1 1 and right building #2 2) and the ground 3 in the urban canyon, and then arrive at the receiving antenna 5.

With regard to these multiple reflected waves, an image technique is introduced to precisely find which position reflection occurs among each building wall surface (left building #1 1 and right building #2 2), and the ground 3.

First, it is assumed that two building wall surfaces (left building #1 1 and right building #2 2) infinitely extend in y- and z-axis directions and the ground 3 infinitely extends in y-axis direction as well such that the size of each reflection surface is much greater than the wavelength of electric wave used.

By this assumption, there are numerous image antennas generated on two building wall surfaces (left building #1 1 and right building #2 2) and image antennas further generated below the ground by the generated image antennas and the transmitting antenna 4 on the ground.

In this case, a received power by the direct wave and multiple reflected waves received by the receiving antenna 5 can be expressed as follows:

$$P_R = P_T \left(\frac{\lambda}{4\pi}\right)^2 \left|\sum_{n=0}^{\infty} G_n R_n \frac{e^{-jkr_n}}{r_n}\right|^2 \quad \text{Eq. (1)}$$

wherein $P_R$ denotes a received power by a direct wave and multiple reflected waves received by a receiving antenna, $P_T$ denotes a transmitted power, $\lambda$ represents a wavelength of electric wave, k indicates a wave number, and n denotes a wave propagation path number where, if n is 0, this represents a direct wave and other values all represent reflected waves. Further, $G_n$ denotes a square root of gain product of transmitting and receiving antennas lying on an n-th wave propagation path, which depends on the relative position between the transmitting and receiving antennas 4 and 5 when the directivity of antennas is considered. Also, $R_n$ denotes a path reflection coefficient which is obtained by multiplying a reflection coefficient of each reflected wave reflected from the building wall surface (left building #1 1, right building #2 2), or the ground 3) on each propagation path by the number of times of reflection, and $r_n$ represents a distance of wave propagation path between n-th receiving image antennas.

The following is a description for a conventional algorithm of searching for propagation paths of a direct wave and multiple reflected waves that exist within an urban canyon model by using an image technique.

When an electric wave sent from the transmitting antenna 4 is reflected from two dielectric surfaces 1 and 2 which are the building wall surfaces of FIG. 1, an infinite number of image antennas corresponding to reflected waves, that is, reflected waves from wall surfaces are generated. Thus, image antennas are also generated below the ground, which correspond to reflected waves including reflected wave once from the ground.

In this regard, an infinite number of image antennas (designated by $r_{nv}$) generated by two building wall surfaces 1 and 2 and the ground 3 will be described below. Here, n denotes a number of each image antenna relative to the building wall surfaces (left building #1 1 and right building #2 2) and v indicates a number of an image antenna relative to the ground 3. At this time, a number of an image antenna on the ground is given 0 and a number of an image antenna below the ground is given 1. Therefore, an image antenna on the ground is represented by $R_{n0}$ and an image antenna below the ground is designated by $R_{n1}$.

First, image antennas by two building wall surfaces (left building #1 1 and right building #2 2) are treated, and thereafter, image antennas by the ground 3 is treated. In particular, an infinite number of image antennas generated by two building wall surfaces (left building #1 1 and right building #2 2) are numbered as follows.

The actual receiving antenna 5 is indicated by $R_{00}$ by giving n=0 thereto. Further, as for image antennas by reflection by two building wall surfaces (left building #1 1 and right building #2 2), as shown in FIG. 2A, odd numbers are given sequentially to image antennas that exist in regions where an x coordinate is less than 0 (i.e., x<0), and even numbers are given sequentially to image antennas that fall in regions where an x coordinate is larger than 0 (i.e., x>0). This numbering rule may be expressed, as in rectangular wave shown in FIG. 2B.

First, the actual antenna generates $R_{10}$ and $R_{20}$ which are two image antennas. Next, the following image antennas consecutively generated from $R_{10}$ have lower limit numbers of the rectangular wave and the following image antennas consecutively generated from $R_{20}$ have upper limit numbers of the rectangular wave.

At this time, in case of calculating a received power by Eq. (1), when an electric wave from each image antenna arrives at the receiving antenna 5, it is required to know that reflections occur several times by the left building #1 1 and the right building #2 2.

With respect to odd image antennas $R_{10}, R_{30}, R_{50}, R_{70}$, etc., initial reflection actually occurs in the left building #1 1 starting from the transmitting antenna 4, and arrives at the receiving antenna 5 via each of the remaining paths.

On the other hand, with respect to even image antennas $R_{20}, R_{40}, R_{60}, R_{80}$, etc., initial reflection actually occurs in the right building #2 2 starting from the transmitting antenna 4, and arrives at the receiving antenna 5 via each of the remaining paths.

In rectangular wave of FIG. 2B, pairs of antennas that lie in vertically same positions, that is, {0}, {1,2}, {3,4}, {5,6}, etc. have the number of times of reflection ($m_n$=0, 1, 2, 3, etc.) in sequence from the front part. A total number of times of reflection of each image antenna for an image antenna number n, $m_n$, is represented as follows:

$$m_n = \frac{(2n+1) + (-1)^{n+1}}{4}$$ Eq. (2)

wherein $m_n$ indicates a total number of times of reflection of each image antenna for an image antenna number n, and n=0, 1, 2, 3, etc.

At this time, a reflection process of an image antenna below the ground is identical to that of an image antenna on the ground except that it includes ground reflection once more.

Meanwhile, a coordinate ($x_n, y_n, z_n$) of an (n, v)-th image antenna can be expressed, from Eqs. (1) and (2), as follows:

$$x_n = (-1)^{m_n} x_t + \left\{(-1)^n m_n + \frac{1 + (-1)^{m_n+1}}{2}\right\} w$$ Eq. (3)

$$y_n = y_t$$

$$z_r = (-1)^v z_t$$

wherein $m_n$ denotes a total number of times of reflection of each image antenna for an image antenna number n, and w indicates a width of road.

As described above, the sequence of generation of image antennas and the rule of their position can be found out by giving a number to each image antenna using the numbering technique of rectangular pulse shape and searching for a position coordinate.

Further, the rule can also be searched of how many times reflection occurs on two building wall surfaces for each image antenna number. A received power calculation formula used in free space can be introduced, in which the whole space is replaced by the free space by flying image antennas corresponding to numerous multiple reflected waves.

Especially, this numbering technique has an advantage that can search for numerous wave propagation paths. At this time, it is assumed that only vertical components in electric field exist to the ground because of the long distance between the transmitting and receiving antennas. Therefore, with respect to reflection in the urban canyon model, horizontal polarization occurs against the ground and vertical polarization occurs against two building wall surfaces. And, the gain of the transmitting and receiving antennas is fixed to 1.64 when a dipole antenna is used therein.

There are prior arts as follows: U.S. Pat. No. 6,341,223 (issued Jan. 22, 2002), entitled "Radio wave propagation prediction method using urban canyon model", Korean Patent Laid-open Publication No. 1999-0080905 (issued Nov. 15, 1999), entitled "Method for predicting propagation characteristic of wave in consideration of polarization effects in urban canyon model", and so on.

These prior art methods cannot recognize the effects of a received power caused by polarization directions of multiple transmitting and receiving antennas in actual urban environments.

In other words, the above-mentioned prior art methods are limited only to a case where each of the transmitting and receiving antennas is a dipole antenna, and thus, cannot recognize the effects of wave propagation characteristic when multiple transmitting antennas are used in actual urban areas.

SUMMARY OF THE INVENTION

It is, therefore, an object of the present invention to provide an apparatus and method for predicting wave propagation characteristic of a system, in which electric wave is sent by multiple antennas and received by a single antenna in an urban canyon model and so on, by searching for all propagation paths of multiple reflected waves from respective image antennas.

In accordance with an embodiment of the present invention, there is an apparatus for predicting wave propagation characteristic of a multiple antenna system, including: a transmission position calculator for calculating transmission positions of multiple transmitting antennas; a wave propagation path searcher for searching for a wave propagation path for each of a plurality of image antennas generated for each of said multiple transmitting antennas; a reflection electric field calculator for calculating a partial reflection electric field on the searched propagation path; and a received power calculator for calculating a received power based on the calculated partial reflection electric field.

In accordance with an another embodiment of the present invention, there is a method for predicting wave propagation characteristic of a multiple antenna system, including: calculating transmission positions of multiple transmitting antennas; searching for a wave propagation path for each of a plurality of image antennas generated for each of said multiple transmitting antennas; calculating a partial reflection electric field on the searched wave propagation path; and calculating a received power based on the calculated partial reflection electric field.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

DESCRIPTION OF SPECIFIC EMBODIMENTS

The advantages, features and aspects of the invention will become apparent from the following description of the embodiments with reference to the accompanying drawings, which is set forth hereinafter, and thus, the present invention will easily be carried out by those skilled in the art. Further, in the following description, well-known arts will not be described in detail if they could obscure the invention in unnecessary detail. Hereinafter, preferred embodiments of the present invention will be described in detail with reference to the accompanying drawings.

Figure 1:
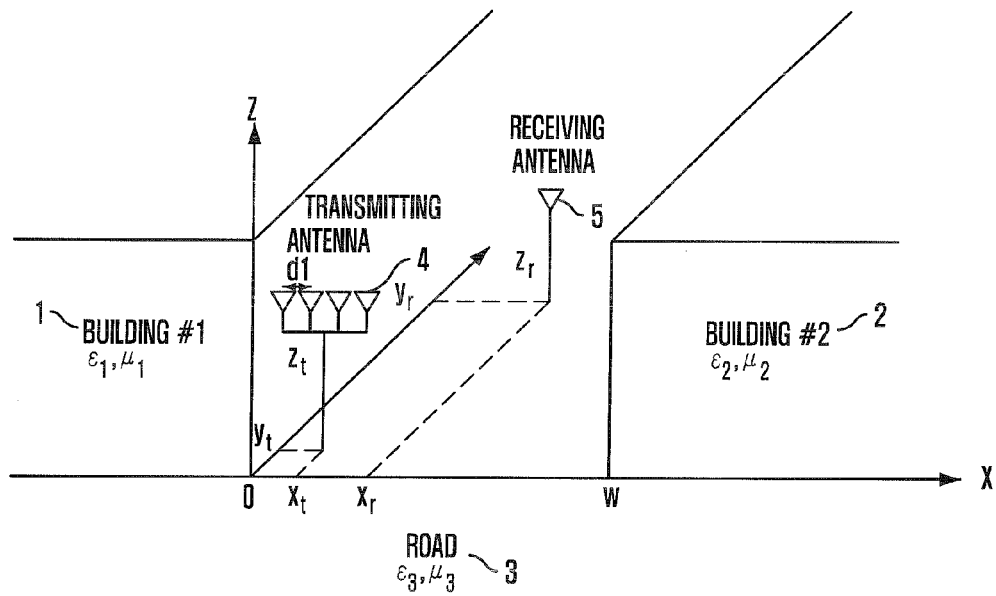
FIG. 1 is an explanatory diagram showing one example of coordinate of a general urban canyon model.
Figure 2A:
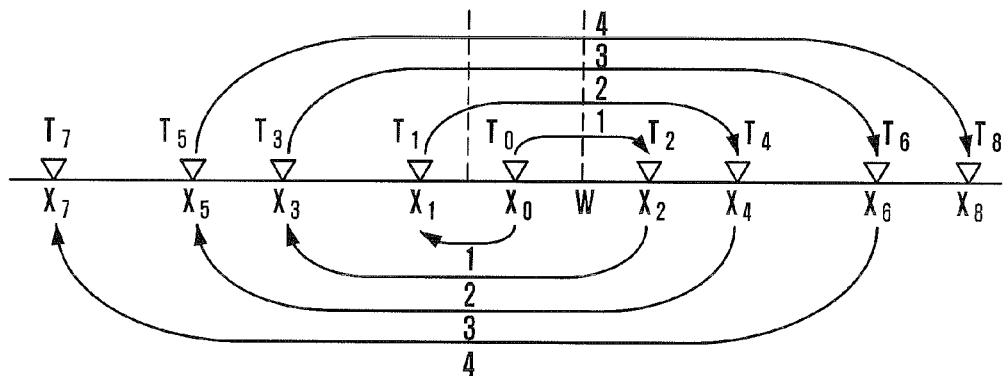
FIG. 2A is a view showing one example of a general generation process of image antennas.
Figure 2B:
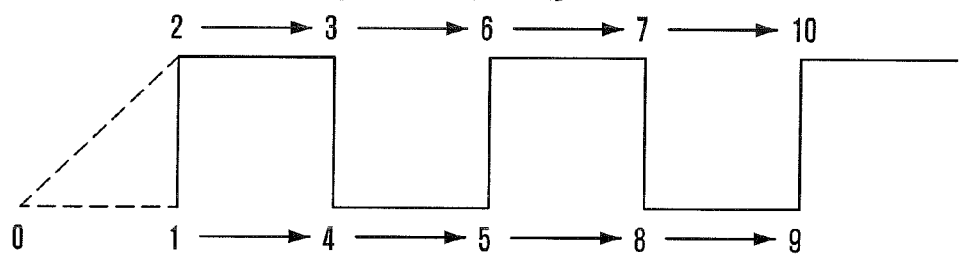
FIG. 2B is an explanatory diagram showing one example of giving number to image antennas according to the prior art.

Although the present invention will be described below by using a coordinate of an urban canyon model presented in FIG. 1, it should be noted that the present invention is not limited to this urban canyon model.

Figure 3:
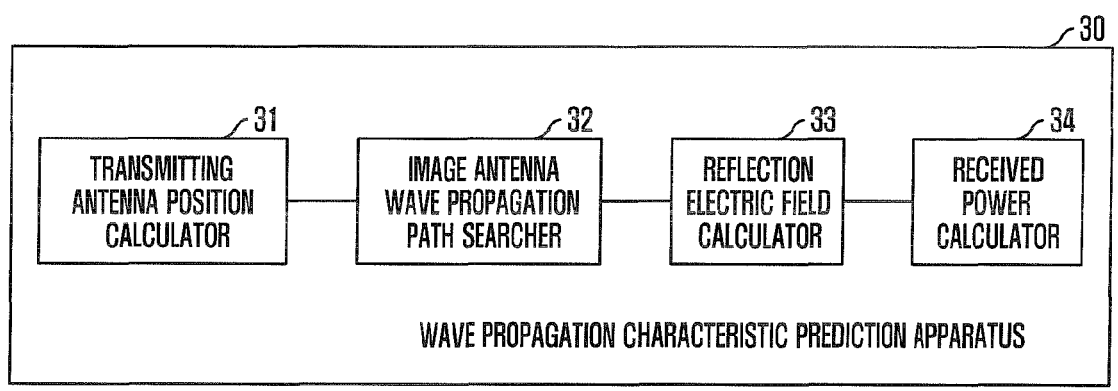
FIG. 3 is a block diagram showing the configuration of an apparatus for predicting wave propagation characteristic of a multiple antenna system in accordance with a preferred embodiment of the present invention.

FIG. 3 is a block diagram showing the configuration of an apparatus for predicting wave propagation characteristic of a multiple antenna system in accordance with a preferred embodiment of the present invention.

As shown in FIG. 3, the inventive apparatus 30 for predicting wave propagation characteristic of a multiple antenna system includes a transmitting antenna position calculator 31, an image antenna wave propagation path searcher 32, a reflection electric field calculator 33, and a received power calculator 34.

To be more specific, the transmitting antenna position calculator 31 calculates precise transmission positions of multiple transmission antennas existing in an urban canyon model in order to use them in acquiring position information on image antennas.

This transmission position calculation process of multiple transmitting antennas will be discussed with reference to FIG. 5 later.

The image antenna wave propagation path searcher 32 gives numbers to a plurality of image antennas generated for each of multiple transmitting antennas, and thus can search for a wave propagation path for each of the image antennas. That is, it acquires position information on each image antenna to which a corresponding number is given.

At this time, the image antenna wave propagation path searcher 32 gives numbers to a plurality of image antennas generated for each of the transmitting antennas by a known technique, and can search for a wave propagation path for each of the image antennas that are given corresponding numbers.

The reflection electric field calculator 33 calculates a partial reflection electric field on the propagation path of each image antenna.

The received power calculator 34 calculates a total received power from an actual total reflection electric field on the propagation path of each image antenna.

The partial reflection electric field calculation of the reflection electric field calculator 33 and the total received power calculation of the received power calculator 34 are associated with each other. Therefore, the received power calculation process will mainly be described herein with reference to Eq. (5) through Eq. (10) later.

Figure 4:
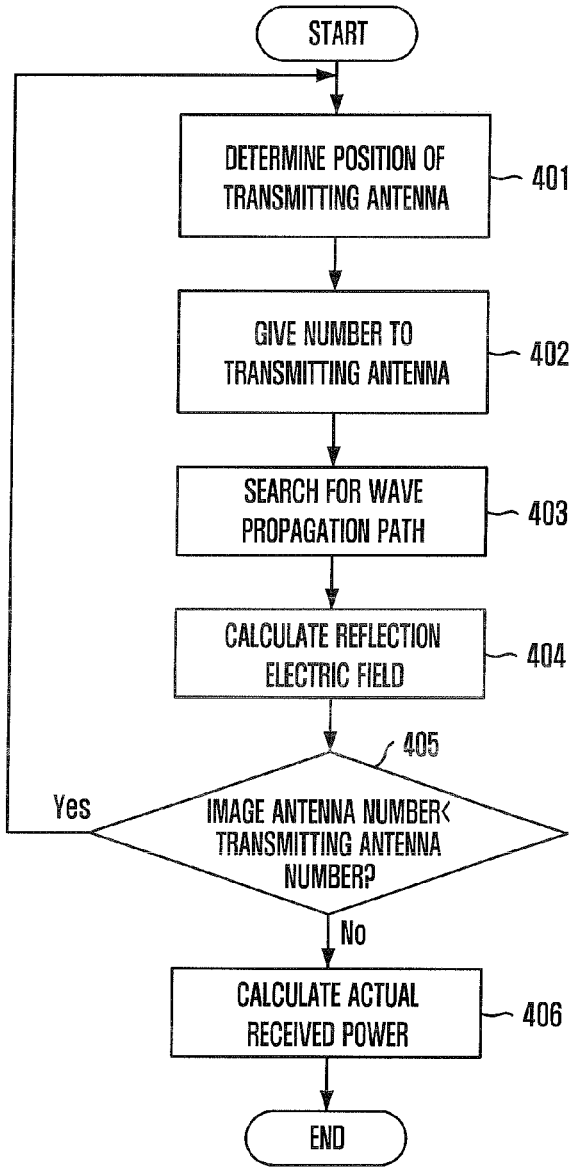
FIG. 4 is a flowchart for explaining a method for predicting wave propagation characteristic for use in a multiple antenna system in accordance with another embodiment of the present invention.

FIG. 4 is a flowchart for explaining a method for predicting wave propagation characteristic of a multiple antenna system in accordance with another preferred embodiment of the present invention.

First of all, the apparatus 30 for predicting wave propagation characteristic calculates precise transmission positions of multiple transmission antennas existing in an urban canyon model in order to use them in acquiring position information on image antennas at step S401.

At a next step S402, the wave propagation characteristic prediction apparatus 30 gives numbers to a plurality of image antennas generated for each of multiple transmitting antennas by a known technique.

And then, at step S403, the wave propagation characteristic prediction apparatus 30 searches a wave propagation path for each image antenna to which a corresponding number is given at step S402. That is, it acquires position information on each image antenna having been given a corresponding number at step S402.

Next, the wave propagation characteristic prediction apparatus 30 calculates a partial reflection electric field on the wave propagation path of each image antenna at step S404. Subsequently, the wave propagation characteristic prediction apparatus 30 compares the number of image antennas with an actual number of transmitting antennas at step S405. As a result of the comparison, if the number of image antennas is less than with an actual number of transmitting antennas, the process of the present invention returns to step S401, and otherwise, that is, if the number of image antennas is greater than with an actual number of transmitting antennas, it computes a total received power from the actual total reflection electric field on the wave propagation path of each image antenna at step S406.

Figure 5:
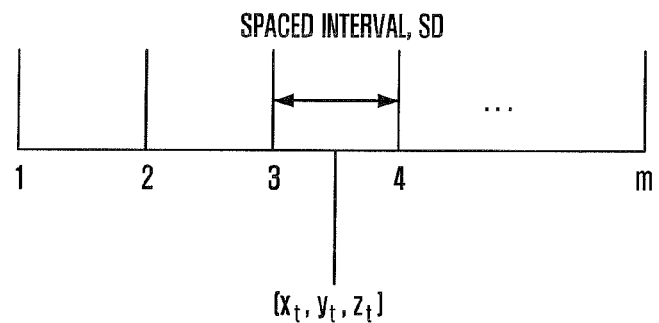
FIG. 5 is a view describing a method for calculating positions of multiple transmitting antennas in accordance with an embodiment of the present invention.

FIG. 5 is a view describing a method for calculating positions of multiple transmitting antennas in accordance with the embodiment of the present invention.

When a coordinate of a transmitting antenna is given as $(x_t, y_t, z_t)$, a coordinate of each of multiple transmitting antennas is expressed as:

$$x'_{ti} = x_t + \left(-\frac{m-(2 \cdot i - 1)}{2} \cdot SD\right) \quad \text{Eq. (4)}$$
$$y'_t = y_t$$
$$z'_t = z_t$$

wherein $x'_{ti}$ denotes an x-axis coordinate of multiple transmitting antennas, $y'_{ti}$ represents a y-axis coordinate of multiple transmitting antennas, and $z'_{ti}$ denotes a z-axis coordinate of multiple transmitting antennas. Further, $x_t$ denotes an x-axis coordinate of a transmitting antenna, $y_t$ denotes a y-axis coordinate of a transmitting antenna, and $z_t$ denotes a z-axis coordinate of a transmitting antenna. In addition, m represents the number of multiple antenna elements, indicates a number of each of multiple antenna elements, and SD denotes a spaced interval between antennas. At this time, the spaced interval between antennas has a sufficiently spaced interval to the extent that there is no correlation between antenna elements.

Based on the positions of transmitting and receiving antennas as above, position information of the image antennas can be calculated by a known technique.

Meanwhile, a received power of the receiving antenna in accordance with the present invention can be calculated as follows:

$$P_R = P_T \left(\frac{\lambda}{4\pi}\right)^2 \left|\sum_{i=1}^{m} \sum_{n=0}^{\infty} G_{in} R_{in} \frac{e^{-jkr_n}}{r_{in}}\right|^2 \quad \text{Eq. (5)}$$

wherein $P_R$ denotes a total received power from an actual total reflection electric field on the propagation path of each image antenna, and $P_T$ denotes a transmitted power. Further, $\lambda$ is a wavelength of electric wave, m represents the number of multiple antenna elements, i indicates a number of each of multiple antenna elements, and k denotes a wave number. When the propagation path number n is 0, this means a direct wave and other values all denote reflected waves. In addition, $G_{in}$ denotes a square root of gain product of transmitting and receiving antennas on an n-th propagation path of the transmitting antenna, and varies depending on a relative position between the transmitting and receiving antennas when the directivity of antenna is considered. Also, $R_{in}$ denotes a path reflection coefficient that is derived by multiplying a reflection coefficient of each of reflected waves from the left building #1 1 and the right building #2 2 or the ground 3 on the propagation path of each transmitting antenna element by the number of times of reflection. Additionally, $r_{in}$ represents a propagation path length between each transmitting antenna element and an n-th receiving image antenna.

A reflection coefficient $R_{in}$ on an n-th propagation path of an i-th transmitting antenna element is expressed as:

$$R_{in} = (\Gamma_{n1})^{(m_n - a_n)} (\Gamma_{n2})^{a_n} \Gamma_{ng} \quad \text{Eq. (6)}$$

wherein $\Gamma_{nj}$ (i.e., $\Gamma_{n1}$ and $\Gamma_{n2}$) represents a reflection coefficient of the building #1 wall surface 1 and the building #2 wall surface 2 on an n-th propagation path, and $\Gamma_{ng}$ denotes a reflection coefficient of the ground. Further, $m_n$ represents the number of times of reflection about building wall surface decided, and $a_n$ indicates the number of times of reflection about the building #2 wall surface 2.

A reflection coefficient $\Gamma_{nj}$ of a building wall surface on an n-th propagation path can be represented as follows:

$$\Gamma_{nj} = \frac{\cos\theta_{nw} - \sqrt{\varepsilon_{rj} - \sin^2\theta_{nw}}}{\cos\theta_{nw} - \sqrt{\varepsilon_{rj} - \sin^2\theta_{nw}}} \quad \text{Eq. (7)}$$

wherein $\theta_{nw}$ represents an incident angle of a building wall surface and $\varepsilon_{rj}$ indicates a relative dielectric constant.

At this time, an incident angle $\theta_{nw}$ of a building wall surface can be expressed as:

$$\theta_{nw} = \sin^{-1}\left(\frac{\sqrt{(y_r - y_t)^2 + (z_r - z_t)^2}}{r_n}\right) \quad \text{Eq. (8)}$$

wherein $y_r$ denotes a y-axis coordinate of a receiving antenna and $y_t$ denotes a y-axis coordinate of a transmitting antenna. Further, $z_r$ represents a z-axis coordinate of a receiving antenna and $z_t$ denotes a z-axis coordinate of a transmitting antenna. Also, $r_n$ represents a propagation path distance between n-th receiving image antennas.

A ground reflection coefficient $\Gamma_{ng}$ can be calculated as:

$$\Gamma_{ng} = \frac{\varepsilon_{rg}\cos\theta_{ng} - \sqrt{\varepsilon_{rg} - \sin^2\theta_{ng}}}{\varepsilon_{rg}\cos\theta_{ng} - \sqrt{\varepsilon_{rg} - \sin^2\theta_{ng}}} \quad \text{Eq. (9)}$$

wherein $\varepsilon_{rg}$ indicates a relative dielectric constant of the ground and $\theta_{ng}$ represents an incident angle of the ground.

At this time, an incident angle $\theta_{ng}$ of the ground can be expressed as follows:

$$\theta_{ng} = \sin^{-1}\left(\frac{\sqrt{(x_r - x_n)^2 + (y_r - y_t)^2}}{r_n}\right) \quad \text{Eq. (10)}$$

wherein $x_r$ denotes an x-axis coordinate of a receiving antenna, and $x_n$ denotes an x-axis coordinate of an image antenna. Further, $y_r$ denotes a y-axis coordinate of a receiving antenna and $y_t$ denotes a y-axis coordinate of a transmitting antenna. Also, $r_n$ denotes a propagation path length between n-th receiving image antennas.

The incident angle and the propagation path of the building wall surface and the ground as discussed above are defined, as shown in FIGS. 6A to 6C.

Figure 6A:
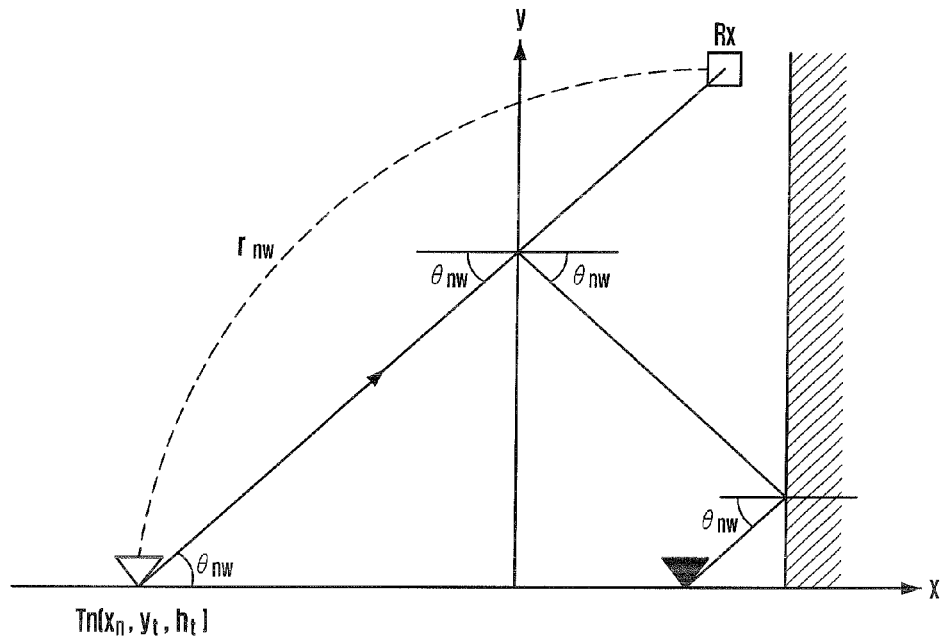
FIG. 6A is a view showing an image antenna arranged on a building wall surface in accordance with the present invention.

FIG. 6A is a view showing an image antenna arranged on a building wall surface in accordance with the present invention.

In FIG. 6A, $\theta_{nw}$ represents an incident angle of a building wall surface, Tn denotes an n-th image transmitting antenna, and Tn $(x_n, t_n, h_t)$ represents a coordinate of Tn. Further, $r_{nw}$ indicates a distance between Tn and a receiving antenna RX.

Figure 6B:
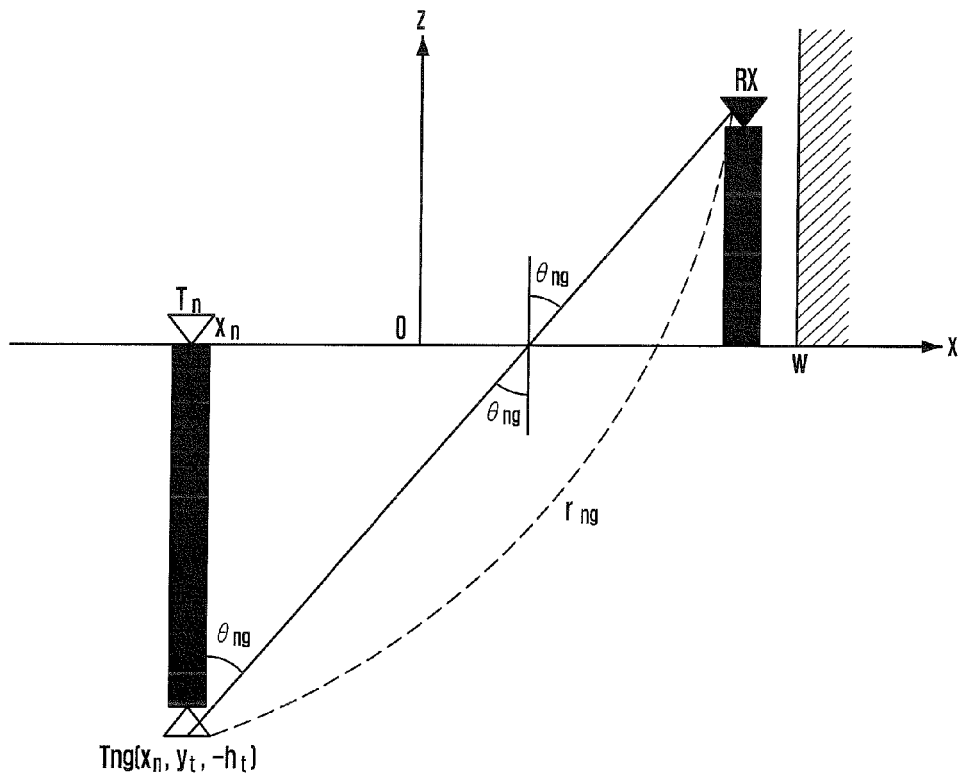
FIG. 6B is a view showing an image antenna arranged with respect to the ground in accordance with the present invention.

FIG. 6B is a view showing an image antenna arranged with respect to the ground in accordance with the present invention.

In FIG. 6B, $\theta_{ng}$ represents an incident angle of the ground, Tn denotes an n-th image transmitting antenna, Tng denotes an image antenna arranged with respect to the ground of Tn, and Tng $(x_n, y_t, -h_t)$ indicates a coordinate of Tng. Further, $r_{ng}$ denotes a distance between the image antenna Tng and a receiving antenna RX.

Figure 6C:
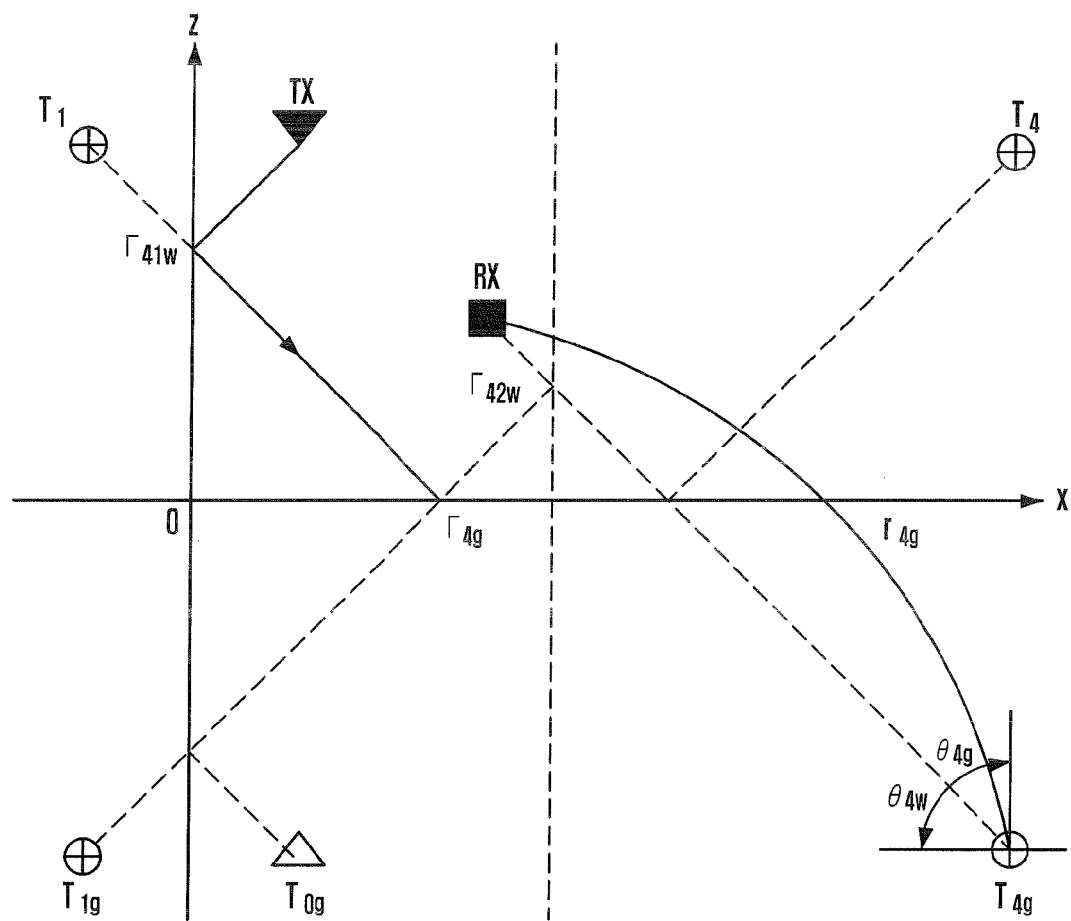
FIG. 6C is a view describing an image antenna and a propagation path of a building wall surface and the ground in accordance with the present invention.

FIG. 6C is a view describing an image antenna and a propagation path of a building wall surface and the ground in accordance with the present invention.

In FIG. 6C, $T_1$ represents a first image transmitting antenna, and $T_{1g}$ indicates a new image antenna arranged with respect to the ground of $T_1$. Further, $T_{0g}$ indicates a new image antenna arranged with respect to the ground of a transmitting antenna TX($T_0$), $T_4$ represents a fourth image transmitting antenna, and $T_{4g}$ indicates an image antenna arranged with respect to the ground of $T_4$. In addition, $\Gamma_{41w}$ represents a reflection coefficient of the building #1 wall surface 1 of the image antenna $T_4$, $\Gamma_{4g}$ denotes a reflection coefficient of the ground of the image antenna $T_4$, and $F_{42w}$ represents a reflection coefficient of the building #2 wall surface 2 of the image antenna $T_4$. Also, $\theta_{4g}$ represents an incident angle of the ground of the image antenna $T_4$ and $\theta_{4w}$ represents an incident angle of the building #1 wall surface 2 of the image antenna $T_4$. Additionally, $r_{4g}$ denotes a distance between the image antenna $T_4$ and RX.

On the other hand, the method of the present invention as mentioned above may be implemented by a software program. Further, the codes and code segments constituting the program can easily be deduced by a computer programmer skilled in the art. Also, the program prepared is stored in a computer-readable recording medium (data storage medium), and read and executed by the computer to implement the present invention. Moreover, the recording medium includes all types of storage medium that can be read by the computer.

As a result, the present invention can predict, three-dimensionally, wave propagation characteristic of a system, in which electric wave is sent by multiple antennas and received by a single antenna in an urban canyon model and so on, by searching for all wave propagation paths of multiple reflected waves from respective image antennas.

In addition, when electric wave is sent by multiple transmitting antennas, the present invention extends the number of paths by a generalized image technique, thereby calculating a received power at a position of each transmitting and receiving antenna.

Further, the present can be used in computing Root Mean Square (RMS) delay spread which is one of critical parameters of digital communications.

Moreover, the present invention can be utilized, as critical parameter, in determining cell radius of base stations which employ multiple transmitting antennas.

The present application contains subject matter related to Korean Patent Application No. 10-2007-0105046, filed in the Korean Intellectual Property Office on Oct. 18, 2007, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. An apparatus for predicting wave propagation characteristic of a multiple antenna system, comprising:
   a transmission position calculator for calculating transmission positions of multiple transmitting antennas;
   a wave propagation path searcher for searching for a wave propagation path for each of a plurality of image antennas generated for each of said multiple transmitting antennas;
   a reflection electric field calculator for calculating a partial reflection electric field on the searched propagation path; and
   a received power calculator for calculating a received power based on the calculated partial reflection electric field.

2. The apparatus of claim 1, wherein the received power calculator calculates a power received by a receiving antenna by summing up received powers by a directed wave and multiple reflected waves received by the receiving antenna for the respective multiple transmitting antennas.

3. The apparatus of claim 2, wherein the wave propagation path searcher gives a number to each of the plurality of image antennas generated for each of multiple transmitting antennas and searches for a wave propagation path of each image antenna having been given a corresponding number.

4. The apparatus of claim 3, wherein the transmission position calculator calculates a position of each of said multiple transmission antennas by using a function of the number of transmitting antennas from a position of predetermined transmitting antenna and a distance between antennas elements in order to use the same in acquiring position information on each of the plurality of image antennas.

5. The apparatus of claim 4, wherein said multiple transmitting antennas are the ones that exist in an urban canyon model.

6. A method for predicting wave propagation characteristic of a multiple antenna system, comprising:
   calculating transmission positions of multiple transmitting antennas;
   searching for a wave propagation path for each of a plurality of image antennas generated for each of said multiple transmitting antennas;
   calculating a partial reflection electric field on the searched wave propagation path; and
   calculating a received power based on the calculated partial reflection electric field.

7. The method of claim 6, wherein, when the number of the plurality of image antennas is greater than that of the multiple transmitting antennas, said calculating a received power calculates a received power by a receiving antenna by summing up received powers by a directed wave and multiple reflected waves received by the receiving antenna for the respective multiple transmitting antennas.

8. The method of claim 7, wherein said searching a wave propagation path gives a number to each of the plurality of image antennas generated for each of said multiple transmitting antennas and searches for a propagation path of each image antenna having been given a corresponding number.

9. The method of claim 8, wherein said calculating a transmission position calculates a position of each of said multiple transmission antennas by using a function of the number of transmitting antennas from a position of a predetermined transmitting antenna and a distance between antennas elements in order to use the same in acquiring position information on each of the plurality of image antennas.

10. The method of claim 9, wherein said multiple transmitting antennas are the ones that exist in an urban canyon model.

* * * * *